Nov. 8, 1966   M. J. WARGO   3,283,973
END GATE SPARE TIRE RACK
Filed Jan. 3, 1964   2 Sheets-Sheet 1
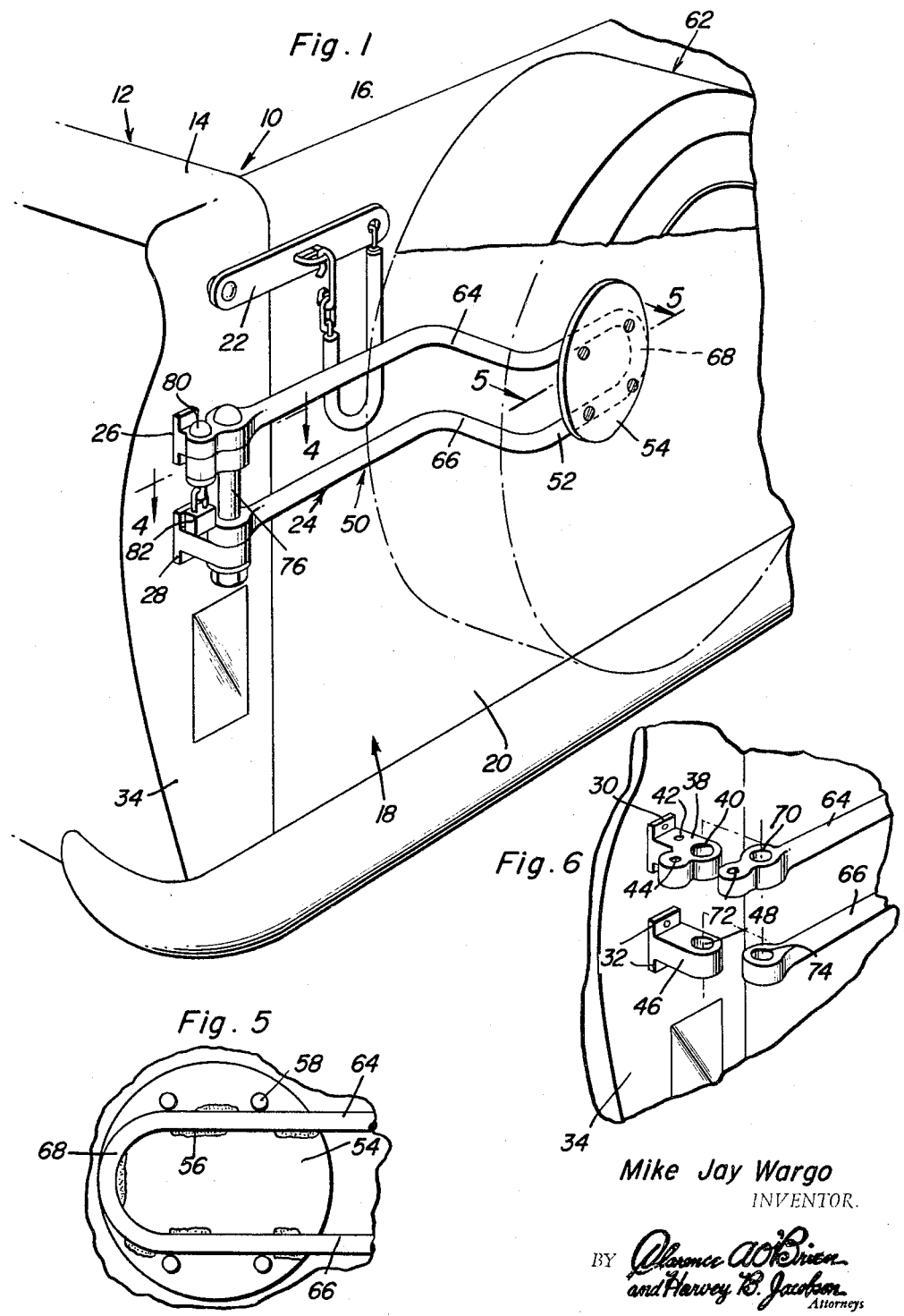
Mike Jay Wargo
INVENTOR.
BY Clarence A. O'Brien
and Harvey B. Jacobson
Attorneys Nov. 8, 1966     M. J. WARGO     3,283,973
END GATE SPARE TIRE RACK
Filed Jan. 3, 1964     2 Sheets-Sheet 2
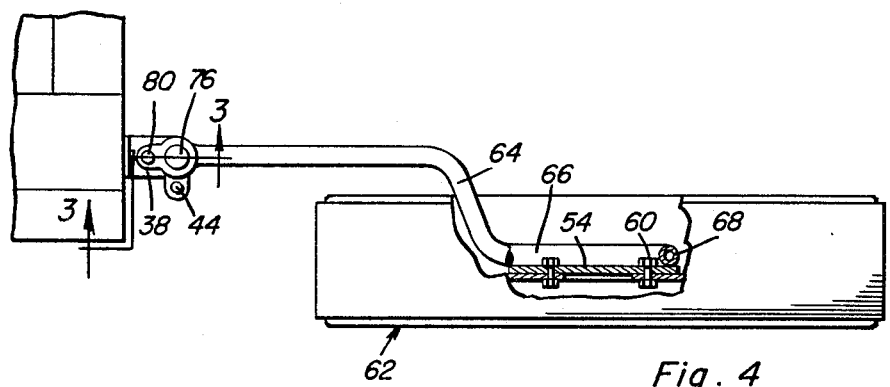
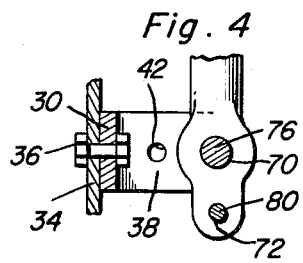
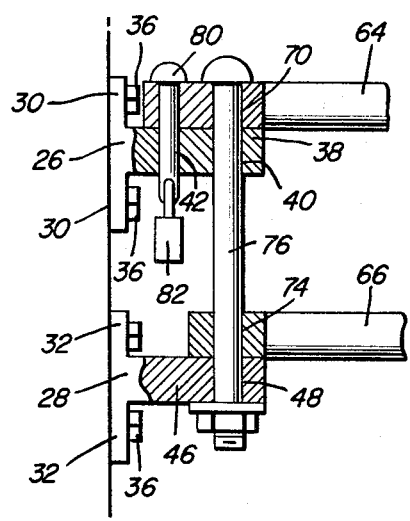
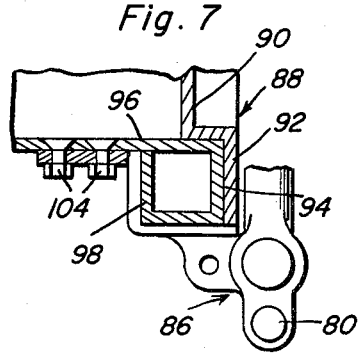
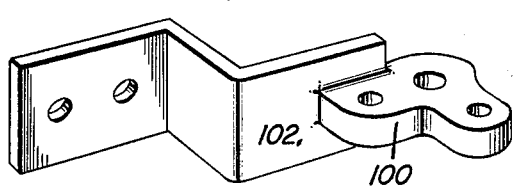
Mike Jay Wargo
INVENTOR.
BY *Clarence A. O'Brien*
*and Harvey B. Jacobson*
Attorneys

United States Patent Office 3,283,973
Patented Nov. 8, 1966

3,283,973
END GATE SPARE TIRE RACK
Mike Jay Wargo, 108 14th St., South Streator, Ill.
Filed Jan. 3, 1964, Ser. No. 335,470
8 Claims. (Cl. 224—42.21)

This invention relates to a novel and useful end gate spare tire rack and more specifically to a spare tire rack adapted to swingably support the spare tire of a pickup truck or the like for movement about an upstanding axis disposed to one side of the load platform or bed of the pickup truck between a first position with the spare tire disposed immediately rearwardly of the end or tailgate of the pickup truck when the tailgate is in the closed position and a second position swung rearwardly and to one side of the load bed of the pickup truck in order that the tailgate of the truck may be swung to its open position without interference with the spare tire rack of the instant invention.

The end gate spare tire rack includes an elongated arm assembly having means on one end adapted to removably support a spare tire and means at the other end pivotally supporting the arm from the rear and one side wall of the load bed of the pickup truck for rotation about an upstanding axis whereby the spare tire supported by the free end of the arm assembly may be swung through a horizontal plane between a position disposed immediately rearwardly of the closed tailgate of the pickup truck and an out-of-the-way position disposed rearwardly of and to one side of the opening normally closed by the tailgate.

The main object of this invention is to provide an end gate spare tire rack which will be capable of supporting the spare tire of a pickup truck or the like in a position disposed immediately rearwardly of the tailgate of the pickup truck but mounted in a manner whereby the spare tire may be swung to an out-of-the-way position enabling the tailgate to be pivoted about its lower edge portion toward the open position without interference with the spare tire supported by the rack of the instant invention.

Another object of this invention is to provide a spare tire rack including means by which the spare tire supported thereby may be releasably locked in its normal position disposed immediately rearwardly of the closed tailgate of the associated pickup truck.

Still another object of this invention is to provide a spare tire rack in accordance with the preceding objects including means by which the spare tire supported thereby may be releasably locked in the aforementioned out-of-the-way position.

Yet another object of this invention is to provide a spare tire rack constructed in a manner whereby it may be readily modified so as to be adapted for support from various types of pickup truck load bed constructions.

A final object of this invention to be specifically enumerated herein is to provide a spare tire rack in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the left rear corner portion of a conventional form of pickup truck shown with the end gate spare tire rack of the instant invention operatively associated therewith and being utilized to support a spare tire in a position disposed immediately rearwardly of the tailgate of the pickup truck;

FIGURE 2 is a fragmentary top plan view of the embodiment illustrated in FIGURE 1 on somewhat of a reduced scale and showing the spare tire rack of the instant invention pivoted to a position shifting the spare tire supported thereby to the out-of-the-way position;

FIGURE 3 is an enlarged fragmentary vertical sectional view taken substantially upon the plane indicated by the section line 3—3 of FIGURE 2;

FIGURE 4 is a fragmentary enlarged horizontal sectional view taken substantially upon the plane indicated by the section line 4—4 of FIGURE 1;

FIGURE 5 is a fragmentary enlarged transverse vertical sectional view taken substantially upon the plane indicated by the section line 5—5 of FIGURE 1;

FIGURE 6 is a fragmentary perspective view similar to that of FIGURE 1 and showing the journal means and the support arm assembly of the spare tire rack in exploded positions relative to each other;

FIGURE 7 is a fragmentary horizontal sectional view similar to that of FIGURE 4 but showing a modified form of spare tire rack and the manner in which the modified form of spare tire rack is adapted to be supported from a slightly differently constructed pickup truck body construction; and FIGURE 8 is an enlarged perspective view of one of the journal members of the modified form of spare tire rack illustrated in FIGURE 7.

Referring now more specifically to the drawings the numeral 10 generally designates a conventional form of pickup truck which includes a load bed body construction generally referred to by the reference numeral 12. The body construction includes a pair of opposite side walls 14, one of which is not illustrated, between which a load-carrying space 16 is defined. The rear end of the load-carrying space 16 is open and may be closed by means of a tailgate assembly generally referred to by the reference numeral 18 which is pivotally secured along its lower marginal edge portion 20 in any convenient manner to the body construction 12 for swinging movement of the upper edge portion of the tailgate 18 rearwardly and downwardly away from the closed position illustrated in FIGURE 1 of the drawings, a latch assembly 22 being provided for releasably retaining the tailgate 18 in the closed position illustrated in FIGURE 1.

The end gate spare tire rack of the instant invention is generally designated by the reference numeral 24 and includes a pair of vertically spaced and aligned journal members 26 and 28. The journal members 26 and 28 include mounting ears 30 and 32 respectively for securing the journal members 26 and 28 to the rear end face 34 of the associated side wall 14 by means of fasteners 36. The journal member 26 includes an arm portion 38 which projects outwardly from the mounting ears 30 and is provided with a large journal bore 40 at its free end. In addition, the free end of the arm portion 38 is provided with a pair of locking bores 42 and 44. The journal member 28 also includes an outwardly projecting arm portion 46 but which is provided only with a large journal bore 48 corresponding and aligned with the journal bore 40.

An elongated support arm assembly generally referred to by the reference numeral 50 is provided and includes a laterally offset portion 52 to which a mounting plate 54 is secured in any convenient manner such as by welding 56, see FIGURE 5. The mounting plate 54 has a plurality of bores 58 formed therethrough adapted to receive a plurality of fasteners 60 which are utilized to bolt the spare tire assembly 62 to the free end of the arm assembly 50.

The arm assembly 50 is defined by a pair of vertically spaced and generally horizontal arm members 64 and 66 interconnected at their free ends by means of an integral curved bight portion 68. The end of the arm member 64 remote from the bight portion 68 includes a large journal bore 70 which is registrable with the journal bore 40 and a single locking bore 72 which is selectively registrable with the bores 42 and 44 as will be hereinafter more fully set forth. In addition, the end of the arm member 66 remote from the bight portion 68 is provided with a large journal bore 74 corresponding to and aligned with the journal bore 48.

An elongated pivot fastener 76 is secured through the pairs of aligned bores 40, 70 and 48, 74 and it may be seen that when the arm assembly 50 is in the position illustrated in FIGURE 1 of the drawings that the bore 72 is registered wtih the bore 42, a locking pin 80 being passed through the aligned bores 44 and 72 and having the hasp of a lock 82 passed through its diametrically bored lower end.

When it is desired to open the tailgate 18, the locking pin 80 is removed and the arm assembly 50 may be swung to the position illustrated in FIGURE 2 of the drawings whereupon the spare tire assembly 62 will be moved rearwardly of and to one side of the opening defined between the rear ends of the side walls 14 of the body 12. If it is desired to lock the arm assembly 50 in the rearwardly projecting position, the locking pin 80 may be passed through the bore 72 and the bore 42 with which the bore 72 is registered when the arm assembly 50 is in the rearwardly projecting position illustrated in FIGURE 2 of the drawings.

With attention now directed more specifically to FIGURES 7 and 8 of the drawings there will be seen a modified form of tire rack assembly generally referred to by the reference numeral 86 and which is adapted for securement to a slightly modified form of pickup truck body construction generally referred to by the reference numeral 88 including a tailgate 90 having flange portions 92 on its opposite ends which overlap the rear end faces 94 of the opposite side walls 96 of the body construction 88.

The body 88 of the modified form of pickup truck includes an upstanding reinforcing post 98 at the rear end of each of its side walls 96 whose rear face is defined by the surface or face 94. The end gate spare tire rack 86 is substantially identical to the tire rack 24 with the exception that the arm portions 100 thereof are fixedly secured to Z-shaped mounting brackets 102 which are secured to the outer surface of the side wall 96 in any convenient manner such as by fasteners 104 and snugly embrace the reinforcing post 98. The special Z-shaped mounting brackets or plates 102 are required in that the flanges 92 completely overlap the rear surface or face 94 and therefore preclude the mounting of the arm portions 100 from the rear face of the side wall 96 in the manner in which the arm portions 38 and 46 are supported from the side wall 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a truck bed body of the type including a pair of longitudinally extending opposite side walls defining a loading opening between their rear ends and having an upstanding end gate disposed in and closing said opening and pivotally secured to said body for rotation about an axis extending transversely of said body and along the lower edge portion of said end gate and movement of said end gate to an open position with the free upper edge portion swung rearwardly and downwardly away from said side walls, an end gate spare tire rack including a first pair of vertically spaced and aligned journal members secured to the rear end portion of one of said side walls, elongated support arm means including a pair of vertically spaced and generally horizontal arm members interconnected at one pair of corresponding ends and including a second pair of vertically spaced and aligned journal members at their other pair of corresponding ends, said arm means being positioned with each of said second journal members vertically aligned with and disposed above the corresponding one of said first journal members, a pivot fastener secured through said aligned pairs of first and second journal members, the journal members of each of the last-mentioned pairs of journal members including means defining bearing surfaces disposed in sliding frictional engagement with each other for support of said arm members from said first journal members, said arm means being swingable between a first position with said one pair of ends spaced slightly behind said end gate when the latter is in the closed position and a second position with said one pair of ends disposed to the rear and to the side of said opening defined by said one side wall, the lowermost portions of said arm means positionable in registry with said opening being disposed at an elevation spaced above a horizontally disposed plane containing the uppermost portions of said end gate when the latter is in its open position, thereby also enabling said arm means to be swung between said first and second positions when said end gate is in its open position, the other end of said arm means including means adapted to support a spare tire therefrom.

2. The combination of claim 1 wherein one of said pairs of aligned first and second journal members includes means, when said arm means is in the second position, defining aligned upstanding bores in which a locking pin may be removably secured for retaining said arm means in said second position.

3. The combination of claim 1 wherein one of said pairs of aligned first and second journal members includes means, when said arm means is in the first position, defining aligned upstanding bores in which a locking pin may be removably secured for retaining said arm means in said first position.

4. The combination of claim 1 wherein said first pair of journal members are supported and project rearwardly from the rear end face of said one side wall.

5. The combination of claim 1 wherein said one side wall, at its rear end, includes an upstanding reinforcing post projecting laterally outwardly from said one side wall, said end gate being received between the rear ends of said side walls and including opposite side upstanding flange portions overlapping the rear end faces of said side walls adjacent said opening, said first pair of journal members including generally horizontally disposed elongated mounting strap portions secured to and extending along the outer surfaces of said one side wall forwardly of said post and contoured at their rear ends to snugly embrace said post.

6. The combination of claim 1 wherein said arm members comprise the leg portions of a generally U-shaped frame including a bight portion by which said arm members are interconnected at their free swinging ends.

7. The combination of claim 6 including a mounting plate secured to and over the rear surfaces of said bight portion and the adjacent portions of said leg portions comprising said means adapted to support a spare tire therefrom.

8. In combination with a truck bed body of the type including a pair of longitudinally extending side walls defining a load opening between the rear ends and having an upstanding end gate disposed in and closing said opening and pivotally secured to said body for rotation about an axis extending transversely of said body and along the lower edge portion of said end gate and movement of said end gate to an open position with the free upper edge portion thereof swung rearwardly and downwardly away from said side walls, an end gate spare tire rack including elongated support arm means, one end of said arm means and the rear end portion of one of said side walls including coacting means pivotally supporting said arm means from said one side wall for movement through a generally horizontally disposed plane about an upstanding axis adjacent the rear of said one side wall between a first position with the other end of said arm means spaced slightly behind said end gate when the latter is in the closed position and a second position with the other end of said arm means disposed to the rear and to the side of said opening defined by said one side wall, the lowermost portions of said arm means positionable in registry with said opening being disposed at an elevation spaced above the horizontal plane containing the uppermost portions of said end gate when the latter is in its open position, thereby also enabling said arm means to be swung between said first and second positions when said end gate is in its open position, the other end of said arm means including means adapted to support a spare tire therefrom.

References Cited by the Examiner

UNITED STATES PATENTS

| | | | |
|---|---|---|---|
| 1,367,414 | 2/1921 | Matlick | 16—128 |
| 2,184,597 | 12/1939 | Iglehart | 16—144 |
| 2,574,465 | 12/1951 | Clark | 224—42.21 X |
| 2,620,105 | 12/1952 | Erickson | 224—42.06 |
| 2,698,118 | 12/1954 | Dickason | 224—42.21 |

FOREIGN PATENTS 330,350   7/1958   Switzerland.

GERALD M. FORLENZA, *Primary Examiner.*

HUGO O. SCHULZ, *Examiner.*

A. GRANT, J. E. OLDS, *Assistant Examiners.*